United States Patent
Biancalana et al.

(10) Patent No.: US 10,684,899 B2
(45) Date of Patent: Jun. 16, 2020

(54) MOBILE APPLICATIONS ARCHITECTURE

(71) Applicant: Northrop Grumman Systems Corporation, Falls Church, VA (US)

(72) Inventors: Joseph Biancalana, Castle Rock, CO (US); Brandon Cleveland, Commerce City, CO (US); Kevin Gilland, Aurora, CO (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 14/206,561

(22) Filed: Mar. 12, 2014

(65) Prior Publication Data

US 2014/0282608 A1    Sep. 18, 2014

Related U.S. Application Data

(60) Provisional application No. 61/779,813, filed on Mar. 13, 2013.

(51) Int. Cl.
 *G06F 9/54*    (2006.01)
(52) U.S. Cl.
 CPC .................... *G06F 9/544* (2013.01)
(58) Field of Classification Search
 None
 See application file for complete search history.

(56) References Cited

U.S. PATENT DOCUMENTS

| | | | | |
|---|---|---|---|---|
| 7,035,944 | B2 * | 4/2006 | Fletcher | G06F 9/465 709/203 |
| 8,977,698 | B2 * | 3/2015 | Veda | G06Q 10/10 709/206 |
| 9,137,125 | B1 * | 9/2015 | Doronichev | H04L 41/509 |
| 9,292,833 | B2 * | 3/2016 | Savage | G06Q 10/103 |
| 2007/0124374 | A1 * | 5/2007 | Arun | G06Q 10/10 709/204 |
| 2009/0143055 | A1 * | 6/2009 | Emek | H04M 1/72525 455/418 |
| 2010/0064062 | A1 * | 3/2010 | Lahay | H04L 67/02 710/5 |

(Continued)

OTHER PUBLICATIONS

Lange et al., "L4Android: A Generic Operating System Framework for Secure Smartphones", Oct. 11, 2011, ACM 978-1-4503-1000-0/11/10, pp. 39-48.*

*Primary Examiner* — Charles E Anya
*Assistant Examiner* — Phuong N Hoang
(74) *Attorney, Agent, or Firm* — Katten Muchin Rosenman LLP

(57) ABSTRACT

A system and method for sharing data and resources among a plurality of applications on a mobile device is disclosed. Embodiments provide a mobile applications architecture that is able to link applications and share the linked applications simultaneously on an Android (or other operating system) mobile device such as a smart phone or table computer. The mobile applications architecture creates a framework that provides an easy interface for third-party applications to quickly integrate and leverage already constructed components and sharing of data among multiple third-party applications thereby reducing the complexity of newly developed capabilities for mobile applications architecture on not just a single device, but multiple devices.

16 Claims, 4 Drawing Sheets

(56) References Cited

U.S. PATENT DOCUMENTS

| | | | |
|---|---|---|---|
| 2010/0323757 A1* | 12/2010 | Seflic | H04M 1/72522 455/557 |
| 2011/0225417 A1* | 9/2011 | Maharajh et al. | 713/150 |
| 2013/0103686 A1* | 4/2013 | Sisneros | 707/736 |
| 2013/0219176 A1* | 8/2013 | Akella | H04L 63/0815 713/165 |
| 2013/0295872 A1* | 11/2013 | Guday | H04W 4/046 455/404.1 |
| 2013/0303143 A1* | 11/2013 | Schrader | H04M 1/72577 455/418 |
| 2013/0305152 A1* | 11/2013 | Griffiths | G06F 3/04883 715/716 |
| 2013/0318042 A1* | 11/2013 | Rajabi | G06F 17/30091 707/624 |
| 2014/0025827 A1* | 1/2014 | Konuk et al. | 709/226 |
| 2014/0068632 A1* | 3/2014 | Tan | G06F 9/542 719/313 |
| 2014/0068779 A1* | 3/2014 | Tan | G06F 21/606 726/26 |
| 2014/0115646 A1* | 4/2014 | Rajgopal et al. | 725/110 |
| 2014/0149512 A1* | 5/2014 | Leitch | 709/204 |
| 2014/0229839 A1* | 8/2014 | Lynch | G06F 9/44505 715/736 |

\* cited by examiner

MOBILE APPLICATIONS ARCHITECTURE

CROSS REFERENCE TO RELATED APPLICATION(S)

This application claims priority from U.S. Provisional Patent Application. No. 61/779,813, filed on Mar. 13, 2013, which is hereby incorporated herein by reference in its entirety.

FIELD

Embodiments are in the technical field of application development, particularly application development for Android devices. More particularly, embodiments disclosed herein relate to a secure, device agnostic, open-architecture application framework which, inter alia, fosters seamless collaboration among Android applications.

BACKGROUND

Android is a Linux-based operating system designed primarily for touchscreen mobile devices such as smart phones and tablet computers. Android has a large number of applications (commonly referred to as "apps") written primarily in a customized version of Java, and which extend functionality of the mobile devices. Certain obstacles to application development include the fact that Android does not use established Java standards, e.g., Java SE and ME, that are used for non-Android platforms. This prevents compatibility among Java applications written for non-Android platforms and those for the Android platform. Instead, Android only reuses the non-Android Java language syntax and semantics, but does not provide the full class libraries and APIs bundled with Java SE or ME, or other non-Android Java standards. In addition, by nature of the Android architecture, sharing of data between applications is severely constrained, if not impossible.

For example, the "Dalvik Virtual Machine" is an isolated virtual guest operating system which rests on top of a Linux kernel on an Android device to execute Android processes. By design, the Dalvik Virtual Machine separates Android applications from one another, effectively segregating the processes of a single application in order to prevent the apps from communicating with one another. The idea is if a malicious Android application shared the same space as other applications, the malicious app could potentially exploit other innocuous apps that may have been poorly designed, lacked security, and/or contained some kind of exploitable flaw. As a result, collaboration between applications is constrained to Android Inter-process Communication(s) (IPC) or requires privileged or root access to the phone.

Accordingly, there exists a need for a framework on the Android platform that facilitates seamless collaboration while reducing or removing the disadvantages involved with Android Inter-process Communications.

SUMMARY

Embodiments are directed to a mobile applications architecture that shares data and resources among a plurality of applications on at least one mobile device that includes a processor and memory. The mobile applications architecture includes: an inter-process communications (IPC) module that utilizes a library for communicating among the plurality of applications; a shared storage module including data containers and a descriptor file; and a utilities module that provides filtering and networking functionality; wherein the shared storage module enables data within the data containers to be shared among the plurality of applications, the data originates from different applications within the plurality of applications, and the utilities module enables the different applications within the plurality of applications to share resources including the filtering and networking functionality. The data within the storage containers may include data of more than one datatype.

In an embodiment, the plurality of applications may be installed on a single mobile device which may run on Android Operating System. The library may be provided by the Android Operating System on the single mobile device.

In an embodiment, the plurality of applications may be installed on multiple mobile devices which may run on Android Operating System. The library may be provided by the Android Operating System on at least one of the multiple mobile devices.

In an embodiment, the mobile applications architecture may further include a security module.

Embodiments are also directed to a method for utilizing a mobile applications architecture to share data and resources among a plurality of applications on a device. The method includes: installing mobile applications architecture on a device, wherein the mobile applications architecture enables data and resources to be shared among a plurality of applications; installing a first application compatible with mobile applications architecture on the mobile applications architecture device; obtaining data using the first mobile applications architecture compatible application; publishing the obtained data to a data container on the mobile applications architecture device via mobile applications architecture; receiving the published data from the data container; running a second mobile applications architecture compatible application on the mobile applications architecture device that utilizes the received data; and utilizing the received data through the second mobile applications architecture compatible application.

Embodiments are further directed to a method for utilizing a mobile applications architecture to share data and resources among a plurality of applications on two or more devices, the method comprising: installing mobile applications architecture on a first device, wherein the mobile applications architecture enables data and resources to be shared among a plurality of applications; installing a first application compatible with mobile applications architecture on the first mobile applications architecture device; obtaining data using the first mobile applications architecture compatible application; publishing the obtained data to a data container on a second mobile applications architecture device via mobile applications architecture; receiving the published data from the data container; running a second mobile applications architecture compatible application on the second mobile applications architecture device that utilizes the received data; and utilizing the received data through the second mobile applications architecture compatible application.

BRIEF DESCRIPTION OF THE DRAWINGS

For the present invention to be clearly understood and readily practiced, embodiments will be described in conjunction with the following figures, wherein.

The detailed description will refer to the following drawings in which like numerals refer to like items, and in which.

DETAILED DESCRIPTION

Figure 1:
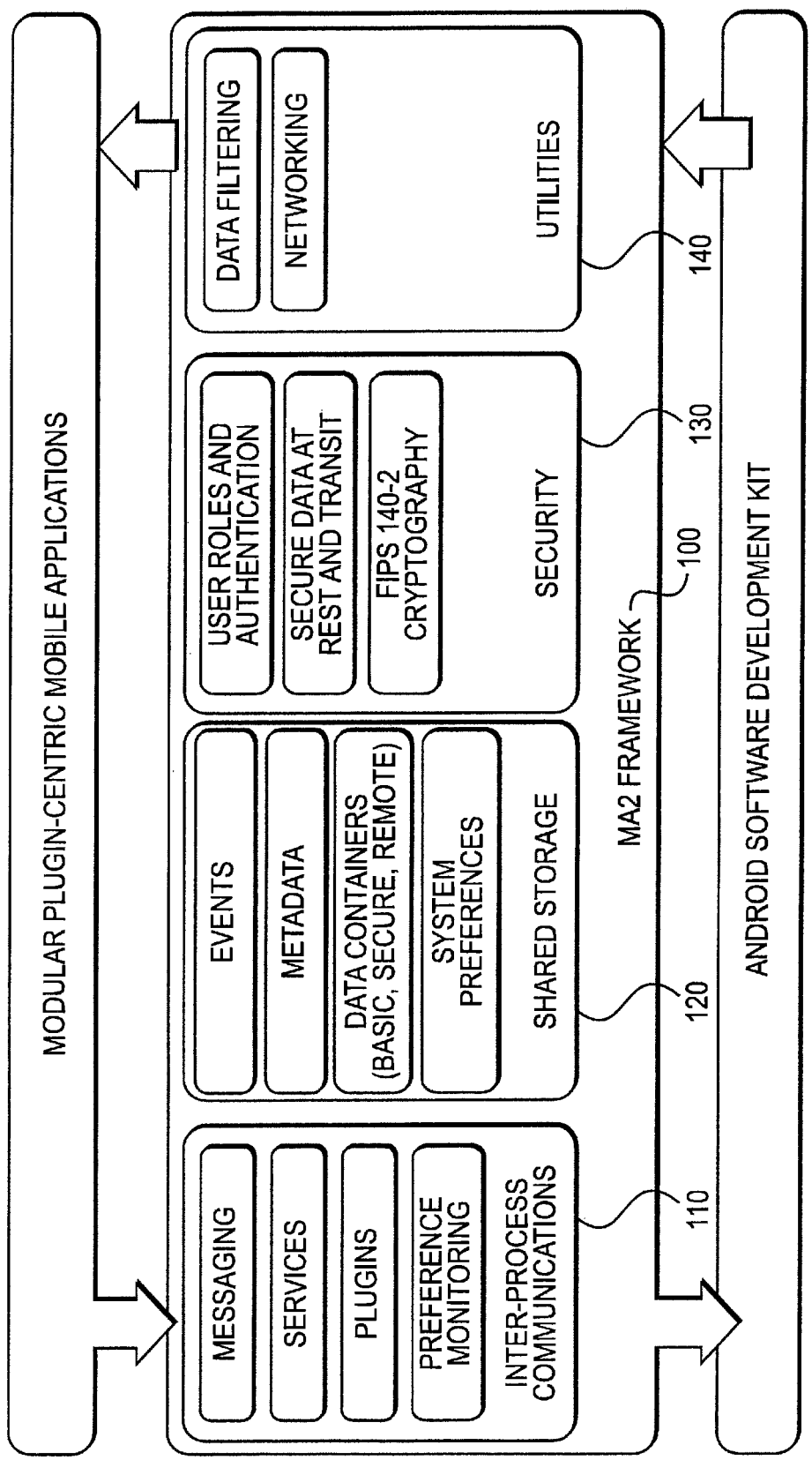
FIG. 1 is a block diagram of an embodiment of a mobile applications architecture that is able to link applications and share information between the linked applications simultaneously on a mobile device such as a smart phone or table computer.

It is to be understood that the figures and descriptions of the present invention may have been simplified to illustrate elements that are relevant for a clear understanding of the present invention, while eliminating, for purposes of clarity, other elements found in a typical mobile applications architecture or typical method for sharing data. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Embodiments disclosed herein provide simplification of the Android Inter-Process Communication (IPC) interface, which is the basis for fostering collaboration of shared data among a plurality of applications. The complexities of typical network communication such as setting up sockets, determining network types, e.g., Wi-Fi vs. 3g vs. 4g, are all encapsulated within the data container (described below). The data container itself not only contains the data, but is capable of connecting and sharing the data out within a mobile applications architecture (MA2) as well as in a MA2 network. The data container is responsible for the discovery of other devices (e.g., mobile phones, smart phones, tablets, mini-tablets, e-books, etc.) on the MA2 network. Further, embodiments disclosed herein reduce the amount of development time in order to integrate components to provide solutions to emerging problems. Still further, other embodiments provide the libraries for Android IPC as well as the generic data containers to repose any particular datatype. A descriptor file may indicate what functions the mapped column can perform.

The MA2 can be pre-installed on the devices or downloaded/installed from an app store. The MA2 contains a core library and a separate tool library that contains a set of tools. Apps that are compatible with MA2 have their own tools in the compatible apps' own library.

The sharing of data also means that each of the devices participating together in the MA2 network will all have access to any of the resources on any of the devices in the MA2 network. For example, in the case where a first device is connected to a highly accurate GPS device, all the other devices within the same MA2 network will be able to utilize the highly accurate GPS device via the data contained within the data containers. The data containers themselves are shared among these phones.

One or more specific embodiments of the present disclosure describe a secure, open-architected application framework that reduces necessary electronic equipment and processors a military or government organization is required to transport with them in order for the unit to conduct their mission. By providing a framework on the Android platform that facilitates seamless collaboration and reduces the overhead involved with Android IPC, all the above software may be develop for the Android.

Embodiments disclosed herein provide a mobile applications architecture that is able to link applications and share the linked applications simultaneously on an Android (or other operating system) mobile device such as a smart phone or table computer. One advantage of this is the ability on the Dalvik Virtual Machine, which is already constrained by isolating applications from one another, for applications to work efficiently and securely together. The Dalvik Virtual Machine is the runtime environment that all Android applications operate in. It is the virtual machine that runs the java code on Android devices. It isolates applications from each other by design. The MA2 framework provides easy to use robust interfaces that allow applications to share data with each other more easily in this environment. In addition, as more applications are developed for the mobile applications architecture of the present disclosure, a greater the number of problems may be addressed with a reduced period of time needed to develop a solution.

In accordance with one or more embodiments of the present disclosure, the MA2 may be configured to create synergy through data and application collaboration, open-architecture code/component reuse, and simplify the Android IPC interface all on an Android device having version Android 3.0 (i.e., Honeycomb) and greater. By utilizing MA2 libraries, the convoluted Android IPC protocol and message handling may be simplified, both for local and remote purposes, to within the MA2 framework thereby fostering collaboration between many or all MA2 components. When a third-party developer creates an application for the MA2 to be utilized among all the relevant components, the developer will extend from the capabilities of MA2 which provides the necessary libraries to facilitate communication between MA2 applications. In short, the purpose of the MA2 is to create a framework provides an easy interface for third-party applications to quickly integrate and leverage already constructed components reducing the complexity of newly developed capabilities for MA2 on not just a single device, but multiple devices.

The MA2 framework may be written entirely in a custom-delivered version of Java for Android and may be developed at an application layer with its own MA2 core library and a separate tools library (which communicates with the MA2 core library) both of which may utilize the standard java libraries and standard Android libraries delivered with the Android 3.0 (i.e., Honeycomb) release (or other releases) of the Android Operating System. Embodiments of the MA2 rely on the standard java and standard Android libraries to communicate with the Android hardware. The core library (or MA2 library) is used for communication and data sharing between all MA2-related tools. The tool library provides the core tools. Third party tools are maintained separately from the MA2 core and tool libraries. Any tool (e.g., core tools that come with MA2, and/or third-party tools that come with third-party MA2-compatible applications) use the MA2 library to collaborate. In an embodiment, these third party tools are only located on the device on which the third party app is installed. These third party tools may or may not be contained within a library.

Any device within the MA2 network has access to the data resulting from the use of the third party tools. The data is the shareable resource. Users may install embodiments of MA2 on Android platforms greater than or equal to Honeycomb because the architecture is and remains device agnostic. The core library is utilized for implementation of the core tools that are installed with MA2 and some or all of the tools mentioned below. Other libraries that are specific to each installed plug-in and that will be used with MA2 are also installed. "Other libraries" refers to third-party libraries that plug-ins may include for their functionality. MA2 does not interfere with or replace third-party libraries. Plug-ins are small software components that use the MA2 core library to communicate with each other. MA2 auto-discovers the plug-ins and broadcast their presence and capabilities out among the other plug-ins. Third party developers need their apps to be compatible with MA2 in order to share data as described. With MA2 installed, the core library delivered with the Android Operating System typically will share one library (or possibly more) with the third party plug-ins that are part of a particular MA2 group.

With reference now to FIG. 1, shown is a block diagram of an embodiment of a mobile applications architecture framework 100 that is able to link applications and share the linked applications simultaneously on a mobile device such as a smart phone, tablet computer, or other type mobile computer. The mobile applications architecture 100 includes an Inter-Process Communications (IPC) module 110, a Shared Storage module 120, a Security module 130, and a Utilities module 140, each of which are described in terms of their functionality below.

The Shared Storage module 120 of MA2 100 includes Data Containers (basic, secure, and remote), a Web Services Definition Language (WSDL)-like descriptor file (shown as "METADATA"), events, and system preferences functionality. The Data Containers serve as generic buckets, which repose data from a given source. Applications which utilize data containers provide a description of the data in the form of metadata. The metadata maps column information to a descriptor file. The descriptor file describes all the standard definitions as well as the required datatypes. The descriptor file tells MA2 how the data looks so MA2 knows how to handle certain data that comes from certain data sources. For instance, a third-party application may describe two columns in their data container as "MyLongitude" and "MyLatitude," both as doubles (i.e., a Java decimal type). In order for a map application to understand that these two column headers describe geographic information which would be plot-able on a map, MyLongitude would map to Longitude, and MyLatitude to Latitude.

Once data resides in a data container, application components may be utilized to render the data as necessary. This occurs in the Utilities module 140, which provides data filtering and networking functionality. For example, while utilizing a purpose-built Network Operations toolkit, a Wi-Fi Scanner application may survey the vicinity for all active Wireless Access Points and clients. All the information regarding each detect is ingested into the data container to include its triangulated geolocation and margin of error or "ellipse". MA2 installation (e.g., via download from Android's App store) includes installation of core tools to be used within the MA2 framework.

In an embodiment, the core tools may include a list tool, map tool, data manager tool, Wi-Fi scanner tool, and Wi-Fi packet sniffer tool. The list tool functions similar to a spreadsheet that shows two-dimensional data in rows and columns for eventual display. It has a high capacity for storage and viewing. When data contains location data, information corresponding to the data would be displayed on the map using the map tool. The data manager tool shows all the different data sources and allows users to manipulate data at a high level. Users may, for example, clear, pause a live data feed, copy records from one source to another, and clear out selections. The Wi-Fi scanner tool scans for any wireless access points within the mobile device's range and collaborates with other mobile devices, hot spots, and access points to determine the geo-location for eventual display on a map using the map tool. The list tool may display more detailed information such as access point names, signal strength, latitude, and longitude. The Wi-Fi packet sniffer collects packets from access points and inputs the data in the list tool. The data may contain packet header information, website destinations, encrypted packet information, etc.

While utilizing any or all of the core tools preferably delivered with MA2 (or alternatively delivered via a subsequent download and installation from an App store), an analyst may render the data in the list tool to display the information in a spreadsheet. The analyst may hide or un-hide columns or sort by one or many columns. If the analyst selected randomly a few rows in the list tool and then switched to the map, the analyst would see the all the items in the list tool displayed on a map, but in addition, the items that were "selected" in the list tool will appear "selected" in the map tool just as it would in any tool made for MA2 that provided the capability for items to be "selected." To illustrate the extensibility of the framework, while utilizing the very same components, a new data container may be populated with very different data from something such as a Demographic toolkit, which rather than collected from something like a Wi-Fi sensor, was queried from a remote database. Again, those very same tools may render the information all the same, though the data is quite different.

By way of the Security module 130, which provides user roles and authentication, secure data at rest and transit, and FIPS 140-2 cryptography functionality, data containers may also have the ability to be secured using standard industry practices in cryptography enabling secure data at rest and in transit. These methods may also speed up development time by handling complex cryptographic algorithm setup for the third party developer. The security module 130 are also utilized to set-up and authenticate users to their desired MA2 network.

On a greater scale of information sharing, not only does MA2 share data containers between applications on a single device, but MA2 may support data container sharing across multiple separate devices. The example discussed above utilizing data collected by the onboard Wi-Fi sensor to refine the geolocation of the wireless access points describes only one scenario. A registry service on a master device detects other devices via broadcast User Datagram packets (UDP). The registry coordinates between the devices utilize a Transmission Control Protocol (TCP) session to share available data containers.

As an open-architecture framework, MA2 provides the libraries for Android IPC as well as generic data containers to repose any particular data type. In other words, MA2 is a combination of new IPC methods as well as adding to the IPC methods that Android provides. MA2 utilizes the standard java libraries (those that come with the Android operating system) to conduct IPC. MA2 does not replace any of the Android libraries. A descriptor file indicates what functions the mapped column may perform. For instance, perhaps a Discrete Signal Processing toolkit for MA2 is being utilized, by which sampled data may be displayed on a spectrum analyzer application component. The spectrum analyzer could be paused in time and a section of the sampled frequency could be "selected." The analyst then may want to display the "selected" data in a list tool which is easily done since the data in the data container has already been tagged as "selected." Later, a Software Defined Radio interface for the MA2 may be constructed. At this point, it is no longer necessary to build a spectrum analyzer since one is already present with the Discrete Signal Processing toolkit. A Signal to Noise Ratio meter may not even be built because one may exist with the previous toolkit. As more components are developed, components only need be "snapped" together to create a toolkit for a particular problem set.

By way of the IPC module 110, which provides messaging, services, plugins, and preference monitoring functionality, the MA2 framework may also provide zero configuration functionality for plugins to interface with extensible hardware platforms that connect to an Android device. Such devices may extend the sensor capabilities of MA2 plugins specifically and Android in general. MA2 provides auto-discovery and methods to simplify plugin and hardware communication and reduce development time.

As an example, a special operations unit may have a tactical Signals Intelligence Collection asset with them. Such a team may carry no less than 7 to 8 transit cases full of electronics equipment plus batteries. The same special operations team may require a cellular phone exploitation kit for captured enemy phones. In order to vet persons of interest, the special operations team may need biometric devices. The special operations team may have a Joint Terminal Air Controller which may require the need for devices to capture gun camera feeds or to view streaming airborne Intelligence Surveillance and Reconnaissance platforms. In addition, if any one of these devices is lost or breaks while deployed forward, the team may wait days, weeks or perhaps have to complete the mission without the device. Instead, with the Android as a platform having the MA2 framework in accordance with one or more embodiments described herein, a user may simply use another Android phone which has the appropriate version of Android installed, reach out to an App Store, authenticate, download, and install the desired applications. MA2 doesn't include any special component download mechanisms. It is fully compatible with existing application distribution services (e.g., Google Play store, Amazon App store, etc.) If MA2 is not already installed on the Android device, it may be downloaded from an App store. Once any Android device has the MA2 framework installed, MA2 allows any app that conforms to MA2's plug-in framework to be compatible. The data obtained by any of the tools mentioned above is shareable and usable across multiple devices with MA2 installed.

As another example, when four team members desire to share data among their mobile devices, the data manager tool would be used to link each of the team member's mobile devices as being part of the team. The data sharing between the four mobile devices is part of a distributed process operation that makes copies of the data to be shared and places copies of the data in data containers on each mobile device of the team using the IPC messaging protocol. The library provides hooks for the applications and/or plug-ins to access the distributed data stored in the data containers. The MA2 library or core library will contain 110, 120, 130, and 140. The tools mentioned above will be contained within a separate library. Each mobile device is running their own instance of both the MA2 library and any separate libraries they would like to run. The core library operates independently from any of the separate libraries that are capable of plugging in to it.

In a further example, a first and second device are included within a MA2 network. The second device has installed a ghost detector app utilizing the device's own ghost sensor tool. The ghost detector app and ghost sensor tool are installed only on the second device. Both devices have MA2 and the core tools installed. In this example, the first device may only have MA2 and core tools installed (i.e., not the ghost detector app nor the ghost sensor tool). When the second device's ghost sensor tool senses ghosts, data corresponding to the location of the ghosts are contained within a data container on the second device. The locations of the ghosts appear on a map on the second device using the map tool and list tools. Because the ghost detector app is MA2 compatible and both devices have MA2 installed, when a map is being viewed on the first device, indications automatically appear on the first device's map as to the locations of the ghosts.

To have an app participate in MA2, a user accesses the app by opening the MA2 app. Once opened, a user would be able to use their MA2 compatible app and also gain access to any other app operating within the MA2 network as well as data that any of the apps utilize and/or produce. By participating in the MA2 network data is shared without needing additional input by the user.

Figure 2:
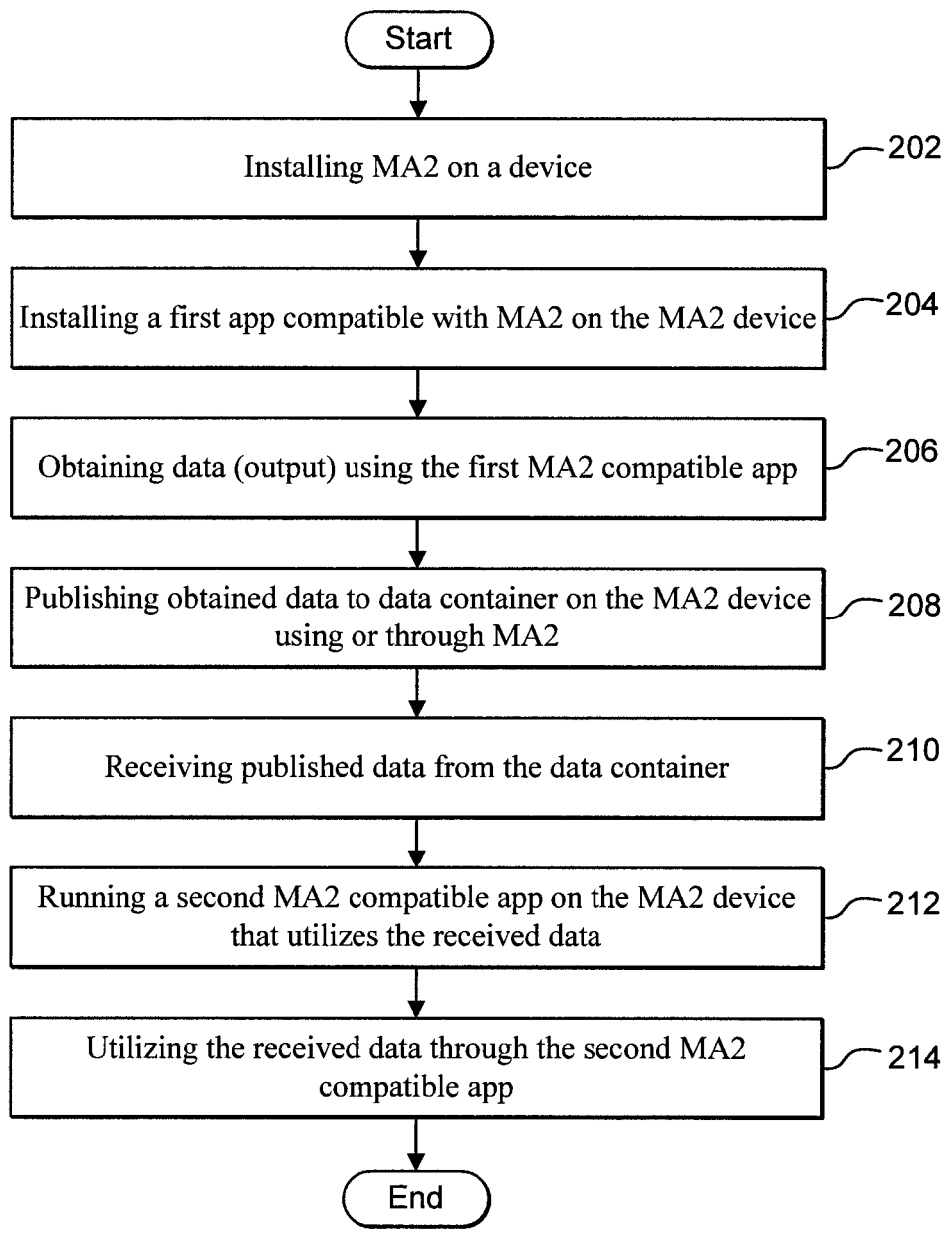
FIG. 2 is a flowchart illustrating an embodiment of a method for sharing data among a plurality of applications on a device.

With reference now to FIG. 2, shown is a flowchart illustrating an embodiment of a method 200 for utilizing mobile applications architecture to share data among a plurality of applications on a device. The method 200 includes:

Installing MA2 on a device, block 202;
Installing a first app compatible with MA2 on the MA2 device, block 204;
Obtaining (i.e., gathering and/or generating data (output)) using the first MA2 compatible app, block 206;
Publishing generated data to data container on the MA2 device via (i.e., using or through) MA2, block 208;
Receiving data published through MA2 in the data container, block 210;
Running a second MA2 compatible app that utilizes the received data, block 212; and
Displaying or otherwise utilizing the received data through the second MA2 compatible app, block 214.

Figure 3:
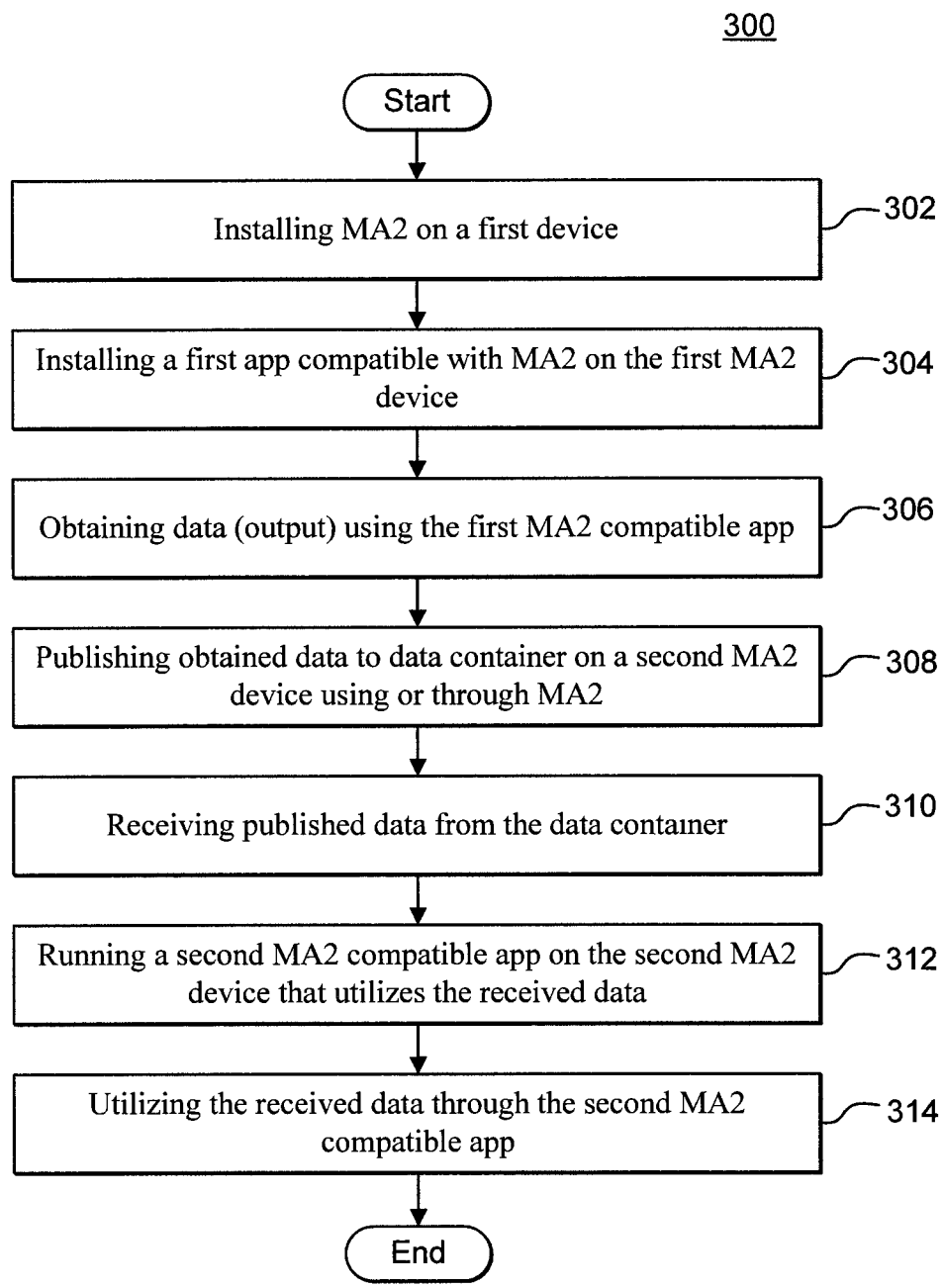
FIG. 3 is a flowchart illustrating an embodiment of a method for sharing data among a plurality of applications on two (or more) devices.

With reference now to FIG. 3, shown is a flowchart illustrating an embodiment of a method 300 for utilizing mobile applications architecture to share data among a plurality of applications on two (or more) devices. The method 300 includes:

Installing MA2 on a first device, block 302;
Installing a first app compatible with MA2 on the first MA2 device, block 304;
Obtaining (i.e., gathering and/or generating data (output)) using the first MA2 compatible app, block 306;
Publishing generated data to data container on a second MA2 device via (i.e., using or through) MA2, block 308;
Receiving data published through MA2 in the data container, block 310;
Running a second MA2 compatible app on the second MA2 device that utilizes the received data, block 312; and Displaying or otherwise utilizing the received data through the second MA2 compatible app, block 314.

Figure 4:
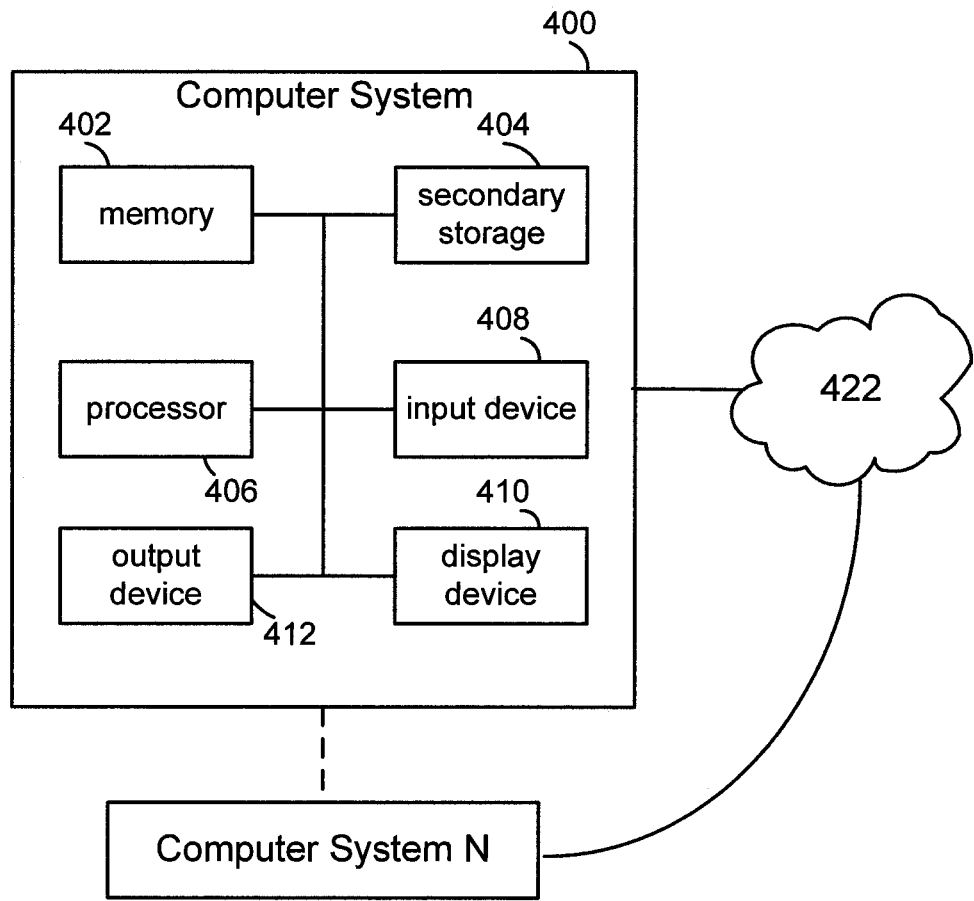
FIG. 4 is a block diagram illustrating an embodiment of a computer system that may be used in embodiments of a mobile applications architecture for sharing data among a plurality of applications on a mobile device that includes a processor and memory.

With reference now to FIG. 4, shown is a block diagram illustrating exemplary hardware components for implementing embodiments of a system and method for automatically disseminating information and queries concerning external organizations to relevant employees. Server 400, or other computer system similarly configured, may include and execute one or more subsystem components to perform functions described herein, including steps of method 100 described above. Likewise, a mobile device which includes some of the same components of computer system 400 may run application and perform steps of method 100 described above. Computer system 400 may connect with network 422, e.g., Internet, or other network, to receive inquires, obtain data, and transmit information and incentives as described above.

Computer system 400 typically includes a memory 402, a secondary storage device 404, and a processor 406. Computer system 400 may also include a plurality of processors 406 and be configured as a plurality of, e.g., bladed servers, or other known server configurations. Computer system 400 may also include an input device 408, a display device 410, and an output device 412. Memory 402 may include RAM or similar types of memory, and it may store one or more applications for execution by processor 406. Secondary storage device 404 may include a hard disk drive, floppy disk drive, CD-ROM drive, or other types of non-volatile data storage. Processor 406 executes the application(s), such as subsystem components, which are stored in memory 402 or secondary storage 404 or received from the Internet or other network 422. The processing by processor 406 may be implemented in software, such as software modules, for execution by computers or other machines. These applications preferably include instructions executable to perform the system and subsystem component (or application) functions and methods described above and illustrated in the FIGS. herein. The applications preferably provide graphical user interfaces (GUIs) through which users may view and interact with subsystem components (or application in mobile device).

Computer system 400 may store one or more database structures in secondary storage 404, for example, for storing and maintaining databases, and other information necessary to perform the above-described methods. Alternatively, such databases may be in storage devices separate from subsystem components.

Also, as noted, processor 406 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system (or application).

Input device 408 may include any device for entering information into computer system 400, such as a touch-screen, keyboard, mouse, cursor-control device, touch-screen, microphone, digital camera, video recorder or camcorder. The input device 408 may be used to enter information into GUIs during performance of the methods described above. Display device 410 may include any type of device for presenting visual information such as, for example, a computer monitor or flat-screen display (or mobile device screen). The display device 410 may display the GUIs and/or output from sub-system components (or application). Output device 412 may include any type of device for presenting a hard copy of information, such as a printer, and other types of output devices include speakers or any device for providing information in audio form.

Examples of computer system 400 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 400 is shown in detail, system and method embodiments described herein may use multiple computer system or servers as necessary or desired to support the users and may also use back-up or redundant servers to prevent network downtime in the event of a failure of a particular server. In addition, although computer system 400 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling a computer system, computer system 400, to perform a particular method, such as methods described above.

MA2 may be implemented as instructions, applications, and/or software modules, as described above, that may be stored in the memory 402 and/or secondary storage 404 and executed by the processor 406 to provide the functionality described herein.

The contemplated modifications and variations specifically mentioned above are considered to be within the spirit and scope of the present invention.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

The invention claimed is:

1. A method for utilizing a mobile applications architecture to share data and resources among a plurality of applications on two or more devices, the method comprising:

installing mobile applications architecture on a first device, wherein the mobile applications architecture includes a data container and enables data and resources to be shared among a plurality of applications, and wherein a mobile applications architecture network is formed between the first device and a second device having the mobile applications architecture;

installing a first application compatible with mobile applications architecture on the first mobile applications architecture device;

obtaining data using the first mobile applications architecture compatible application;

publishing the obtained data to the data container of the mobile applications architecture on the second mobile applications architecture device via the mobile applications architecture network, wherein the first mobile applications architecture compatible application provides the mobile applications architecture with a description of the published data regarding how the mobile applications architecture interprets the published data;

receiving the published data from the data container;

running a second mobile applications architecture compatible application on the second mobile applications architecture device that utilizes the received data; and utilizing the received data through the second mobile applications architecture compatible application.

2. The method of claim 1 wherein the utilizing the received data through the second mobile applications architecture compatible application includes displaying the received data on a display of the second mobile applications architecture device.

3. The method of claim 1 wherein the obtained data within the data container includes data of more than one datatype.

4. The method of claim 1 wherein the first mobile applications architecture device and the second mobile applications architecture device run on Android Operating.

5. The method of claim 1 wherein at least some of the data that is shared among the plurality of applications originates from a GPS device.

6. The method of claim 1 wherein at least some of the data that is shared among the plurality of applications originates from a Wi-Fi scanner.

7. The method of claim 6, wherein some of the data originated from the Wi-Fi scanner is ingested into the data container of the mobile applications architecture of the first device.

8. The method of claim 1 wherein at least some of the data that is shared among the plurality of applications originates from a spectrum analyzer sampler.

9. The method of claim 1, wherein the obtaining includes the first mobile applications architecture compatible application generating the data.

10. The method of claim 1, wherein the obtaining includes the first mobile applications architecture compatible application gathering the data.

11. The method of claim 1, wherein the data container of the first device discovers the second device in the mobile applications architecture network.

12. The method of claim 1, wherein the mobile applications architecture includes a shared storage module that includes the data container.

13. The method of claim 12, wherein the shared storage module includes a descriptor file that describes standard definitions and required datatypes.

14. The method of claim 13, wherein the description of the published data is in a form of metadata, and information of the published data is mapped to the descriptor file.

15. The method of claim 1, wherein the mobile applications architecture includes a utilities module that provides networking functionality for the mobile applications architecture network.

16. The method of claim 1, wherein the data container contains data, and is capable of connecting and sharing the data within the mobile applications architecture network.

* * * * *